(12) United States Patent
Giroudiere et al.

(10) Patent No.: US 8,512,645 B2
(45) Date of Patent: Aug. 20, 2013

(54) BAYONET TUBE EXCHANGER-REACTOR ALLOWING OPERATION WITH PRESSURE DIFFERENCES OF THE ORDER OF 100 BARS BETWEEN THE TUBE SIDE AND THE SHELL SIDE

(75) Inventors: Fabrice Giroudiere, Orlienas (FR); Bernard Langlois, St Germain en Laye (FR); Jean Christian Tricard, Paray Vieille Poste (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 256 days.

(21) Appl. No.: 12/669,212

(22) PCT Filed: Jun. 24, 2008

(86) PCT No.: PCT/FR2008/000888
§ 371 (c)(1),
(2), (4) Date: Jun. 14, 2010

(87) PCT Pub. No.: WO2009/024664
PCT Pub. Date: Feb. 26, 2009

(65) Prior Publication Data
US 2010/0254891 A1    Oct. 7, 2010

(30) Foreign Application Priority Data
Jul. 20, 2007   (FR) ...................... 07 05316

(51) Int. Cl.
*F28D 7/00*    (2006.01)
(52) U.S. Cl.
USPC ......................................... 422/201

(58) Field of Classification Search
USPC ......................................... 422/201
See application file for complete search history.

(56) References Cited

U.S. PATENT DOCUMENTS

| | | | |
|---|---|---|---|
| 3,119,671 A | 1/1964 | George et al. | |
| 3,220,385 A | 11/1965 | Sellin | |
| 4,229,419 A | 10/1980 | Haese | |
| 4,371,452 A | 2/1983 | Ohsaki et al. | |
| 4,972,903 A * | 11/1990 | Kwok | 165/158 |
| 5,935,531 A | 8/1999 | Giacobbe | |
| 2003/0101651 A1* | 6/2003 | Weedon | 48/197 R |
| 2008/0000622 A1* | 1/2008 | Hugues et al. | 165/145 |

FOREIGN PATENT DOCUMENTS

| | | |
|---|---|---|
| FR | 2 374 076 A | 7/1978 |
| FR | 2 588 564 A | 4/1987 |
| GB | 2 050 413 A | 1/1980 |
| WO | WO 01/56690 A | 8/2001 |

OTHER PUBLICATIONS

"International Search Report," International Application No. PCT/FR2008/000888, Date of Completion Dec. 18, 2008, Date of Mailing Jan. 12, 2009, 3pages.

* cited by examiner

*Primary Examiner* — Paul Wartalowicz
(74) *Attorney, Agent, or Firm* — Millen, White, Zelano & Branigan, P.C.

(57) ABSTRACT

The present invention describes an exchanger-reactor for carrying out endothermic reactions, comprising a shell inside which a heat transfer fluid moves, said shell enclosing a plurality of tubes inside which the reactant fluid moves, the tubes being of the bayonet type, and the reactor not having a tube plate. This reactor may operate with a pressure difference between the tube side and the shell side which may be up to 100 bars.

8 Claims, 4 Drawing Sheets ical strength, there is also a limit to the allowed density of the tubes on the tube plate; said limit depends on the tube diameter, and is approximately 10 tubes/m² for a tube diameter of 170 mm.

BAYONET TUBE EXCHANGER-REACTOR ALLOWING OPERATION WITH PRESSURE DIFFERENCES OF THE ORDER OF 100 BARS BETWEEN THE TUBE SIDE AND THE SHELL SIDE

FIELD OF THE INVENTION

The present invention relates to an exchanger-reactor consisting of a shell enclosing a plurality of tubes, which structure is termed a shell-and-tube reactor by the skilled person, said exchanger-reactor allowing highly endothermic reactions to be carried out, such as the natural gas steam reforming reaction, the reactive fluid moving inside the tubes and the heat transfer fluid moving outside the tubes (also termed the shell side by the skilled person).

The reactor size of the exchanger-reactor of the invention can reach a diameter of more than 4 meters, or even more than 10 meters, with a pressure difference between the inside of the tubes and the outside of the tubes which may reach 30 bars to 100 bars (1 bar=0.1 megaPascals), without using a tube plate to ensure the distribution of the reactive fluid over all of the tubes. However, the reactor of the invention can readily be produced in dimensions of less than 4 meters in diameter.

In the remainder of the text, the term "tube side" is used to denote the chemical reaction and the movement of reaction fluids inside said tubes, and "shell side" is used to denote that relating to the transfer of heat from the heat transfer fluid to the reaction fluid and the movement of said heat transfer fluid.

EXAMINATION OF THE PRIOR ART

The prior art in the field of exchanger-reactors for carrying out highly endothermic reactions, such as the reaction for steam reforming a hydrocarbon cut, corresponds to the reactor represented in FIG. 1.

That type of exchanger-reactor has a system for distributing reactive fluid using a first tube plate and a system for collecting effluents using a second tube plate.

A bayonet tube 4 can be defined as being constituted by an inner tube 5 contained in an outer tube 6, the inner tube 5 and the outer tube 6 being substantially coaxial.

The heat transfer fluid is generally generated by combustion carried out outside the exchanger-reactor using any combustion system, such as furnaces or boilers, which employ burners. The heat transfer fluid may also be constituted by recovered fumes, or a hot fluid which is available on site, such as steam.

Movement of the heat transfer fluid may be channeled inside chimneys 10 surrounding the bayonet tubes 4 at least over a certain length and defining an annular space 10 which is suitable for the heat transfer fluid to move inside said annular space.

In order to appreciate the invention, the limitations of a tube plate have to be discussed.

In the prior art, the tube plate in exchanger-reactors can be defined as a perforated plate which extends substantially along a section of the reactor, each perforation receiving a reaction tube. The set of reaction tubes thus has its inlet (or outlet) end located on the inlet (respectively outlet) tube plate.

The inlet tube plate (i) thus separates the volume of the reactor into a first space 20 located above said tube plate, said first space containing the reaction fluid and allowing it to be distributed in each of the reaction tubes, and a second space 21 located below said tube plate, said second space surrounding the tubes and containing only heat transfer fluid.

In the same manner, the outlet tube plate(s) separates the volume of the reactor into a third space 22 located above said tube plate, said third space containing only effluents from the reaction deriving from each reaction tube.

The first space 20 is in fact included between the inlet tube plate (i) and the outlet tube plate(s) and contains only the reaction fluid introduced into said space 20 via the pipework denoted A in FIG. 1.

In the case of an exchanger-reactor of the prior art comprising bayonet tubes, as shown in FIG. 1, the reactor has two tube plates, the upper one(s) receiving the outlet end of the central tubes 5, the lower one (i) receiving the inlet end to the annular zone included between the central tube 5 and the outer tube 6. The reaction fluid is distributed via the space 20 included between the lower tube plate (i) and the upper tube plate (s), using the inlet tube (A).

In the case of FIG. 1, the shell side corresponds to the space 21 outside the reaction tubes and is located below the lower tube plate (i).

FIG. 1 clearly shows that in an exchanger-reactor of the prior art comprising bayonet tubes, the inlet and outlet for each bayonet tube 4 is made at the level of the inlet and outlet tube plates, and thus inside the reactor.

However, the pressure difference between the inside of the tubes 5 and the outside or shell side of the tubes 21 which contains the heat transfer fluid may be several tens of bars. In the particular case of the steam reforming reaction, this pressure difference may be as high as 25 bars to 40 bars (1 bar=0.1 MPa).

The lower tube plate (i) may thus have its upper face adjacent to the fluid introduction zone 20, and its lower face adjacent to the heat transfer fluid movement zone 21 which is subjected to a pressure difference of 25 to 50 bars.

The skilled person will be aware that the dimensions of a tube plate which is capable of resisting such pressure differences results in very substantial thicknesses which is not practicable once the reactor diameter reaches a value of about ten meters.

As an example, the table below provides tube plate thicknesses in mm ($10^{-3}$ meters) for reactor diameters of 2 to 10 meters, and for a pressure difference either side of the tube plate of 25, 30 and 35 bars (columns)

|  |  | Reactor diameter | | |
|---|---|---|---|---|
|  |  | 2 m | 5 m | 10 m |
| Pressure difference | 25 bar | 193 mm | 483 mm | 967 mm |
|  | 30 bar | 212 mm | 530 mm | 1059 mm |
|  | 35 bar | 229 mm | 572 mm | 1144 mm |

If a maximum thickness of the order of 400 mm is assumed for the tube plate, then the reactor size is limited to approximately 5 meters in diameter for a pressure difference either side of the tube plate of 25 bars. This limiting size is even lower if the pressure difference either side of the tube plate is greater. Thus, if the pressure difference either side of the tube plate is 35 bars, the maximum reactor diameter is no more than approximately 3 meters.

From the point of view of mechanical strength, there is also a limit to the allowed density of the tubes on the tube plate; said limit depends on the tube diameter, and is approximately 10 tubes/m² for a tube diameter of 170 mm.

The reactor of the present invention can exceed the size limit for prior art reactors, i.e. comprising a tube plate, by dispensing with said tube plate, distribution of the reactive fluids and collection of the effluents being carried out entirely outside the reactor.

The exchanger-reactor of the present invention can overcome a second problem linked to filling the bayonet tubes with catalyst. In a prior art reactor, the bayonet tubes are filled with catalyst via the space 20 included between the two tube plates. However, that space is limited and the presence of numerous tubes fixed to the upper tube plate makes it very awkward.

In the reactor of the present invention, the bayonet tubes are filled from their end located outside the reactor, which is in a much less restrictive environment.

A further advantage of the reactor of the invention is that it functions with a heat transfer fluid which is generated in situ, i.e. using combustion carried out inside the exchanger-reactor itself on the shell side. Such "in situ" combustion may be carried out using burners such as those described in French application 06/10999, said burners, which are generally longilinear in shape, being interposed between the bayonet tubes.

BRIEF DESCRIPTION OF THE INVENTION

The exchanger-reactor in accordance with the present invention consists of a shell with a cylindrical shape closed by an upper dome and a lower bottom within which the heat transfer fluid moves, said shell enclosing a plurality of parallel tubes with a substantially vertical axis inside which the reaction fluid moves, the reaction tubes being of the bayonet type and having a density in the range 2 to 12 tubes per $m^2$ of reactor cross section, the spacing between each bayonet tube, or centre-to-centre distance, being in the range 2 to 5 times the internal diameter of the outer tube 6, the inlet and outlet of each bayonet tube being located outside the reactor, and the heat transfer fluid being obtained by combustion carried out in situ using longilinear burners 8 interposed between said bayonet tubes 4, forming a triangular pattern, the centre distance of axes between the burners being in the range 2 to 5 times the diameter of the outer tube 6 of a bayonet tube.

The reactor of the invention does not have a tube plate.

Figure 1:
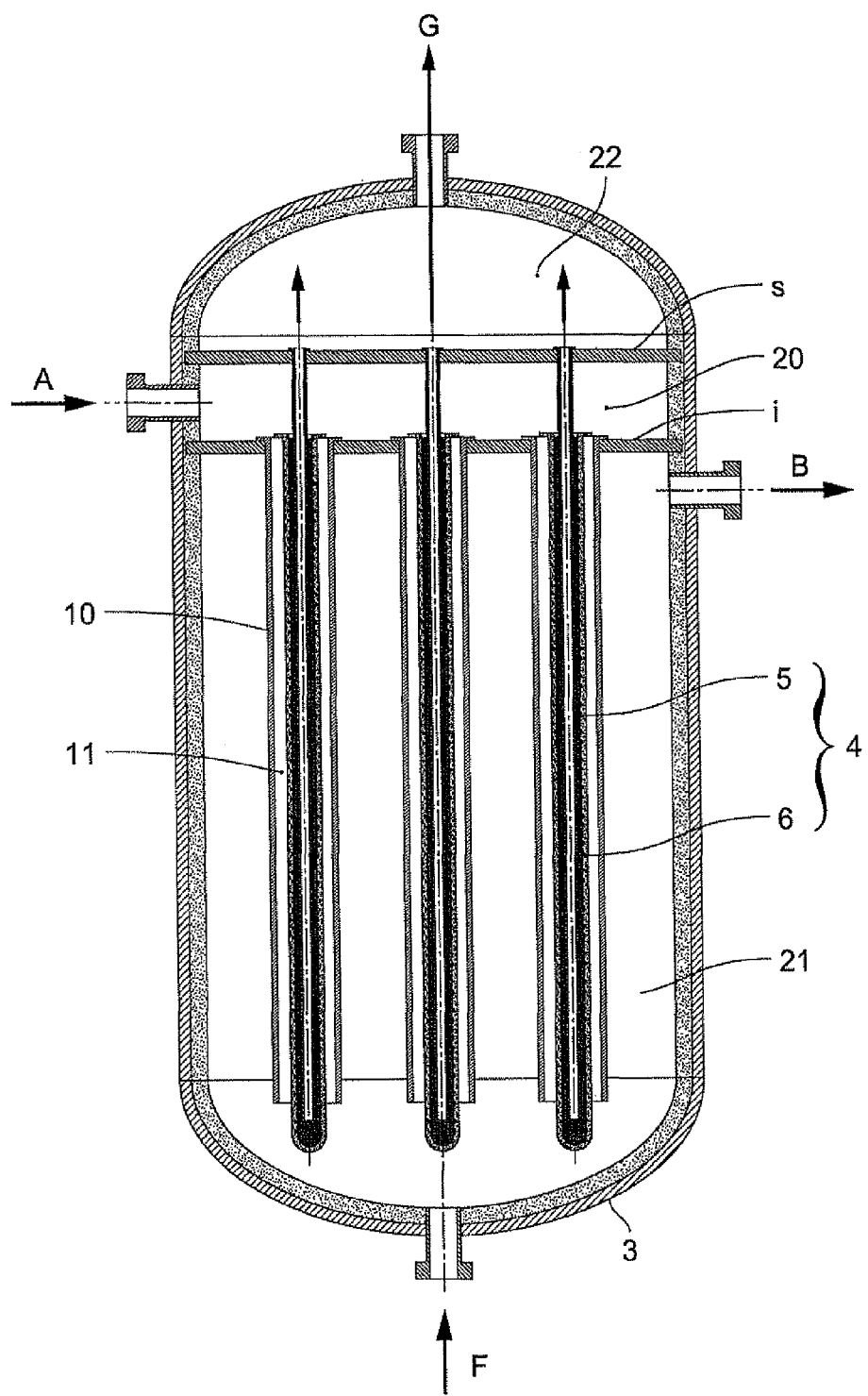
FIG. 1 shows a prior art bayonet tube exchanger-reactor with a lower tube plate for the distribution of reactive fluids, and an upper tube plate to collect effluents.
Figure 2:
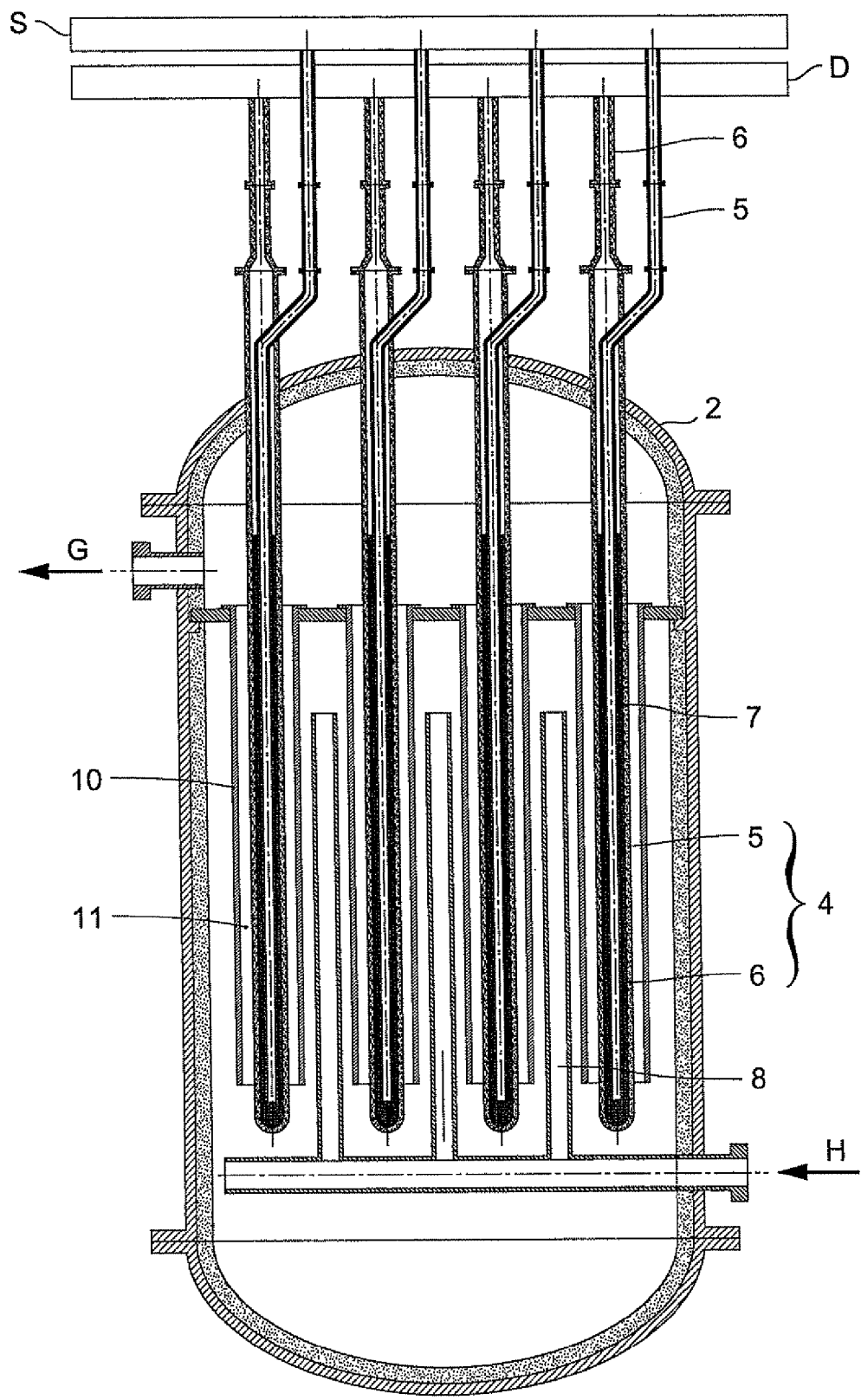
FIG. 2 shows an exchanger-reactor of the invention, i.e. with no tube plate, with the end of the bayonet tubes being located outside the reactor, the heat transfer fluid being derived from combustion carried out inside the reactor using longilinear burners interposed between the bayonet tubes.

In the exchanger-reactor of the present invention, the inlet and outlet of each bayonet tube are located outside the reactor, as can be seen in FIG. 2.

In a preferred variation of the exchanger-reactor, each bayonet tube 4 is surrounded by a cylindrical chimney 10 which is substantially coaxial with the bayonet tube, the heat transfer fluid moving inside the annular space 11 included between the outer wall of the bayonet tube 4 and said chimney 10 at a velocity in the range 20 m/s to 50 m/s.

The bayonet tubes are preferably assembled in accordance with a triangular pattern. The spacing between each bayonet tube, or centre-to-centre distance, is generally in the range 2 to 5 times the internal diameter of the outer tube 6.

A square spacing pattern is also entirely within the scope of the present invention.

Figure 3:
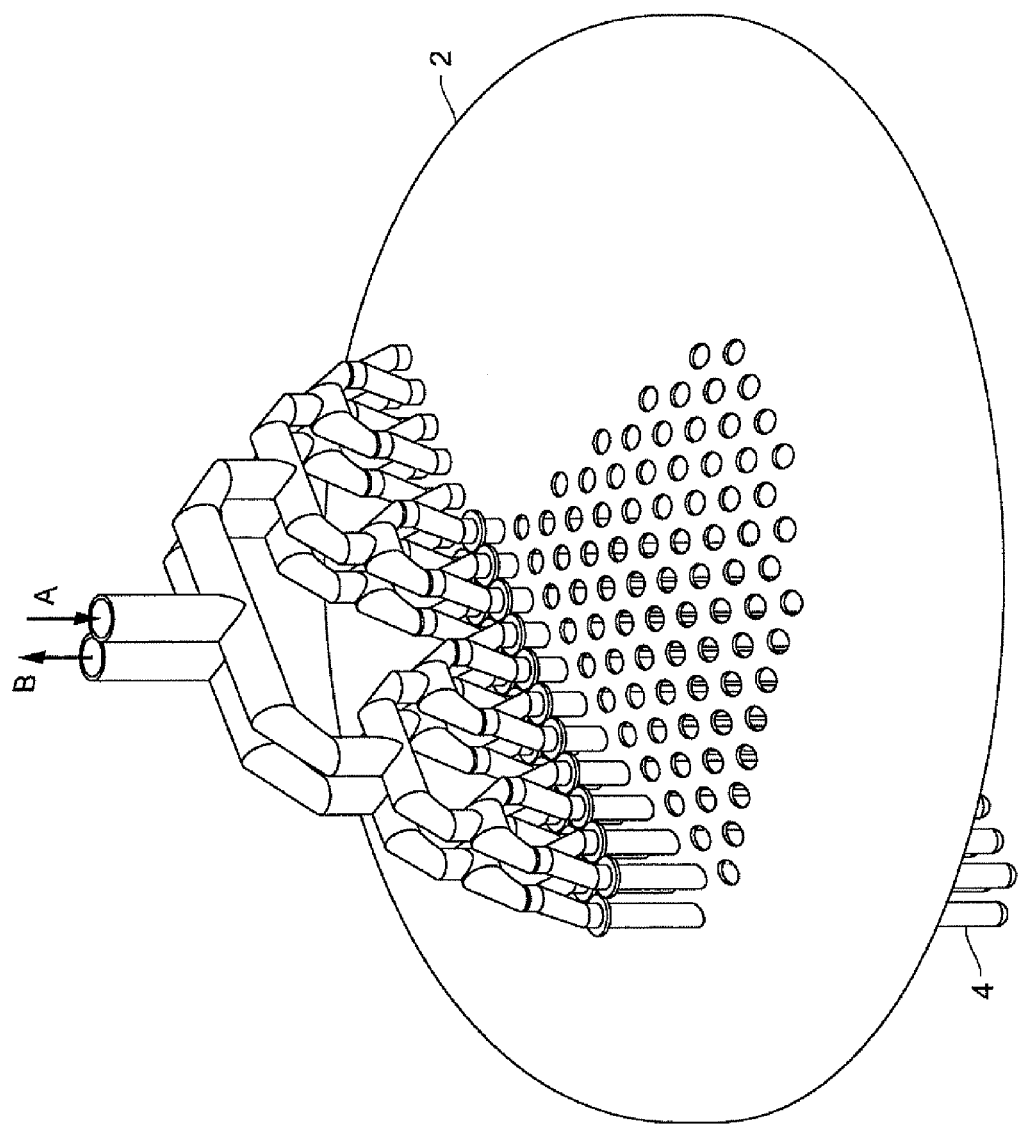
FIG. 3 shows an example of a distribution and collection device for the reaction fluids in the reactor of the invention.

The inner tube 5 of each bayonet tube 4 passes through the outer tube 6 at a point located outside the reactor, at a distance of at least one meter with respect to the upper dome of the exchanger-reactor, and at an angle in the range 30° to 60° with respect to the vertical. This disposition can cleanly separate the inlet and the outlet of each bayonet tube 4 in order to facilitate positioning of the reaction fluid distribution device and the device for collecting the reaction effluents as can be seen in FIG. 3.

Preferably, the inner tube 5 of each bayonet tube 4 is supplied from a principal supply line which branches into N branches, each branch supplying one inner tube, N being in the range 5 to 100, preferably in the range 10 to 50.

Preferably, the outer tube 6 of each bayonet tube 4 is connected to a primary collector, itself connected to a secondary collector and so on to a final collector which corresponds to a number M of collectors in the range 2 to 10.

Preferably, the reactive fluid is introduced via the inlet end of the annular zone 7 included between the outer tube 6 and the inner tube 5, said annular zone 7 being at least partially filled with catalyst.

The reaction effluents are recovered via the outlet end of the central tube 5.

In general, the heat transfer fluid is constituted by combustion fumes, said combustion taking place in situ, i.e. using burners located inside the reactor itself and being interposed between the bayonet tubes in equipment which is distinct from the present exchanger-reactor. The combustion fumes leave the reactor via the outlet pipework G located in the upper portion of the reactor.

In accordance with the invention, the heat transfer fluid supplying the heat necessary for the reaction is obtained by combustion carried out in situ using longilinear burners 8 which are interposed between the bayonet tubes 4.

These longilinear burners are described in French patent application 06/10999.

Figure 4:
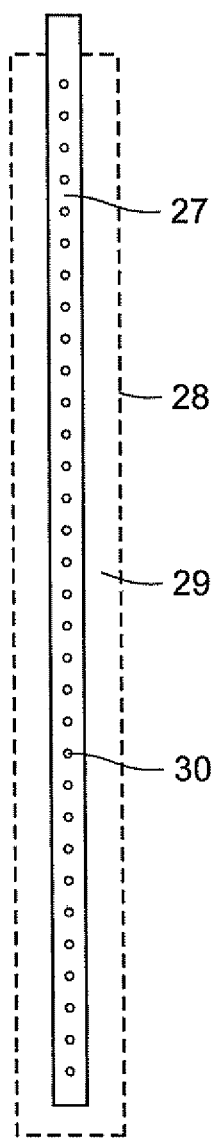
FIG. 4 shows an example of burners which may be used to generate heat transfer fluid inside the exchanger-reactor of the invention.

In the remainder of the text, they will be understood, as shown in FIG. 4, to be burners with no pre-mixing having a cylindrical geometry, with length Lb and diameter Db, with a ratio Lb/Db in the range 10 to 500, preferably in the range 30 to 300.

These burners have a central fuel distributor 27 with orifices 30 which may be distributed in a non-uniform manner, and having a porous element 28 which is annular in shape surrounding the central distributor 27 over at least its entire length Lb, the thickness of said porous element 28 being in the range 0.5 to 5 cm, and the inner surface of said porous element 28 being located at a distance from the central distributor 27 which is in the range 0.5 cm to 10 cm. This is precisely the distance corresponding to the zone denoted 29 in FIG. 4.

Preferably, the longilinear burners form a triangular pattern, the centre distance of axes between the burners being in the range 2 to 5 times the external diameter of the bayonet tubes.

The invention also consists of a process for steam reforming a hydrocarbon cut using the present exchanger-reactor.

In accordance with a variation of the process of the invention, the fuel used to carry out combustion in situ is a gas containing more than 90% hydrogen.

In general, the process for steam reforming a hydrocarbon cut using the exchanger-reactor of the invention is operated at a shell side pressure in the range 1 to 10 bars absolute (1 bar=$10^5$ pascals), and at a pressure inside the bayonet tubes in the range 25 to 50 bars absolute.

The temperature inside the reaction tubes is generally in the range 700° C. to 950° C.

DETAILED DESCRIPTION OF THE INVENTION

The exchanger-reactor of the present invention is intended to carry out highly endothermic reactions at temperatures which may be up to 950° C. Typically, it may be used for steam reforming hydrocarbon cuts, in particular naphtha or natural gas, with a view to the production of hydrogen.

The description below refers to FIG. 2.

The exchanger-reactor of the invention is constituted by a shell with a generally cylindrical shape 1 closed in its upper portion by a dome 2 with a substantially ellipsoidal shape and in its lower portion by a bottom 3 with a substantially ellipsoidal shape, said shell 1 enclosing a plurality of vertical tubes 4 with length L extending along the cylindrical portion of the shell 1.

The tubes 4 are of the bayonet type, i.e. they are constituted by an inner tube 5 contained in an outer tube 6, the inner tube and the outer tube being substantially coaxial. The coaxial state is obtained, for example, by means of centering fins welded at regular distances to the inner tube 5, meaning that a fixed distance from the outer tube 6 can be maintained.

The annular space 7 included between the inner tube 5 and the outer tube 6 is generally filled with catalyst, said catalyst having the shape of cylindrical particles which, in the case of the steam reforming reaction, typically have a length of a few millimeters and a diameter of a few millimeters.

The shape of the catalyst particles is not a characteristic element of the invention, which latter is compatible with any shape for catalyst particles with a size which allows them to be introduced into the annular portion 7 of the vertical tubes 4.

The reaction fluid is preferably introduced into the bayonet tube 4 via the annular catalytic zone 7 the inlet end of which is outside the reactor, the steam reforming reactions being developed in the annular catalytic zone, and the effluents being recovered at the outlet from the central tube 5, said outlet also being located outside the reactor.

Another configuration in which the reaction fluid is introduced via the central tube 5 and the effluents are recovered at the outlet from the annular zone 7 is also possible.

The reactive fluids thus move inside the bayonet tubes 4, firstly by descending along the annular zone 7 of the tube, then by rising along the central tube 5, said tubes 4 having their inlet/outlet end located outside the exchanger-reactor, and said tubes 4 being heated by a heat transfer fluid moving on the shell side 8.

The nature of the heat transfer fluid is of no importance in the context of the present invention. It is constituted by fumes derived from combustion carried out inside the exchanger-reactor itself using specific burners such as those described in French patent application 06/10999.

The ratio H/D between the height H of the reactor and its diameter D is generally in the range 2 to 8, and preferably in the range 2.5 to 6.

The bayonet tubes 4 are generally provided with a chimney 10 which surrounds them in a substantially coaxial manner, to obtain a combustion fume movement velocity along the tube to be heated in the range 5 m/s to 50 m/s, preferably in the range 20 m/s to 40 m/s.

The number of tubes to be heated per $m^2$ of cross section of the reactor is generally in the range 2 to 12, preferably in the range 3 to 8. The term "cross section of the reactor" means the geometric cross section taken to be empty of any internal elements.

The bayonet tubes 4 usually form a triangular pattern with a centre-to-centre distance in the range 2 to 5 times the internal diameter of the outer tube 6.

When in situ combustion generating the heat transfer fluid is carried out using longilinear burners, these are interposed between the bayonet tubes and thus form a triangular pattern with the centre-to-centre distance between the burners being in the range 2 to 5 times the external diameter of said bayonet tubes.

EXAMPLE IN ACCORDANCE WITH THE INVENTION

The example below gives the dimensions of an exchanger-reactor in accordance with the invention intended to produce 90000 $Nm^3$/hour of $H_2$ by steam reforming natural gas.

The fuel used to provide the heat necessary for the steam reforming reaction had the following composition, as mole %:

$H_2$: 92.10%
$CH_4$: 5.35%
$CO_2$: 0.78%
CO: 1.5%
$N_2$: 0.25%

The temperature inside the bayonet tubes was 900° C.

The temperature of the fumes moving on the shell side was an average of: 1200° C.

The pressure inside the bayonet tubes was: 35 bars.

The pressure of the fumes moving on the shell side was: 5 bars.

The pressure difference between the tube and shell was thus 30 bars.

The principal dimensions of the reactor of the invention were as follows:

Total height of reactor (with upper and lower ends): 16 m;
Reactor diameter: 7 m;
H/D ratio: 2.3;
The tubes were of the bayonet type;
Tube length: 12 m;
External diameter of tubes to be heated: 200 mm;
Diameter of central tube: 50 mm;
Centre-to-centre distance of tubes to be heated: 300 mm;
Number of tubes: 235 tubes distributed in a triangular pattern;
External diameter of porous burners: 100 mm;
Length of porous burners: 5 m;
Number of porous burners: 470
Centre-to-centre distance between porous burners: 600 mm.

The annular portion of the bayonet tubes was filled with a steam reforming catalyst based on nickel in the form of cylindrical pellets, each catalyst particle having the following dimensions:

pellet diameter: 10 mm;
pellet length: 13 mm.

The reaction fluid was supplied to each reaction tube via the inlet end of the outer tube 6.

The reaction fluid inlet distributor had a 20-branched shape, as can be seen in FIG. 3.

The reaction effluent was recovered via the outlet end of the central tube 5.

The outlet collector for the reaction effluents had a 4-branched shape, as can be seen in FIG. 3.

The central tube 5 was separated from the outer tube 6 by a distance of 2 meters above the upper dome of the reactor at an angle of 30° with respect to vertical.

The catalyst was filled via the inlet end of the outer tubes 6.

Access to the annular zone of the outer tube 6 was facilitated by dismantling the sheaths at the upper portion. Since the end of the central tube 5 was outside the outer tube 6 of the bayonet, there was no risk of placing catalyst inside the central tube 5 when charging the annular space.

In order to facilitate loading, the bayonet tubes could be vibrated, for example via their lower end which is accessible via a manhole located in the shell and using a vibrator attached for the time for loading the tube concerned.

The invention claimed is:

1. An exchanger-reactor comprising:
   a shell with a cylindrical shape closed by an upper dome and a lower bottom within which heat transfer fluid moves, said shell enclosing a plurality of parallel tubes having a substantially vertical axis inside which reaction fluid moves, the parallel tubes being of the bayonet configuration and comprising an inner tube (5) and an outer tube (6),
   said parallel tubes having a density in the range of 2 to 12 tubes per m² of reactor cross section, wherein the center-to-center spacing between the parallel bayonet tubes is in the range of 2 to 5 times the internal diameter of the outer tube (6) of said parallel bayonet tubes, the inlet and an outlet of each bayonet tube being located outside the exchanger-reactor, and
   longilinear burners (8) interposed between the parallel tubes of bayonet configuration (4), forming a triangular pattern, the center distance of axes between the burners being in the range 2 to 5 times the diameter of the outer tube (6) of said parallel bayonet tubes, said burners being able to produce heat transfer fluid obtained by combustion carried out in situ,
   wherein each of said parallel tubes of bayonet configuration is surrounded by a cylindrical chimney (10) which is substantially coaxial with the outer tube (6), and
   wherein the inner tube (5) of each of said parallel tubes of bayonet configuration passes through the outer tube (6) at a point located outside the reactor, at a distance of at least 1 meter with respect to the upper dome of the exchanger-reactor and at an angle in the range 30° to 60° with respect to the vertical.

2. An exchanger-reactor according to claim 1, in which the outer tube (6) of each of said parrallel tubes of bayonet configuration is connected to a primary collector, which is itself connected to a secondary collector, and so on until the final collector corresponds to a number M of collectors in the range of 2 to 10.

3. An exchanger-reactor according to claim 1, in which the inner tube (5) of each of said parallel tubes of bayonet configuration is supplied from a principal supply tube which is branched into N branches, each branch supplying one inner tube (5), N being in the range of 5 to 100.

4. An exchanger reactor according to claim 3, wherein N is in the range of 10 to 50.

5. A process for conducting steam reforming of a hydrocarbon cut, said process comprising:
   introducing steam and said hydrocarbon cut into said parallel tubes of bayonet configuration (4) of said exchanger-reactor according to claim 1, wherein an annular zone (7) is defined in each of said parallel tubes between said inner tube (5) and said outer tube (6) and said annular zone (7) contains a catalyst; and
   heating said parallel tubes of bayonet configuration (4) by said longilinear burners (8) whereby steam reforming of said hydrocarbon cut occurs within said parallel tubes of bayonet configuration (4);
   wherein in said exchanger-reactor the shell side pressure is in the range 1 to 10 bars absolute, and the pressure inside the parallel tubes of bayonet configuration is in the range of 25 to 50 bars absolute.

6. A process for steam reforming a hydrocarbon cut according to claim 5, wherein the fuel for said combustion carried out in situ is a portion of steam reforming effluent.

7. A process for steam reforming a hydrocarbon cut according to claim 5, wherein the heat transfer fluid moves inside annular spaces (11) between each outer tube (6) and respective chimney (10) at a velocity in the range of 20 m/s to 50 m/s.

8. A process for steam reforming a hydrocarbon cut according to claim 5, wherein said steam and said hydrocarbon cut are introduced into inlet ends of the annular zones (7) and steam reforming effluents are recovered via outlet ends of said inner tubes (5).

* * * * *

UNITED STATES PATENT AND TRADEMARK OFFICE
CERTIFICATE OF CORRECTION

PATENT NO.       : 8,512,645 B2
APPLICATION NO. : 12/669212
DATED            : August 20, 2013
INVENTOR(S)      : Giroudiere et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this

Fifteenth Day of September, 2015

Michelle K. Lee
*Director of the United States Patent and Trademark Office*